Inventor
David B. Foster

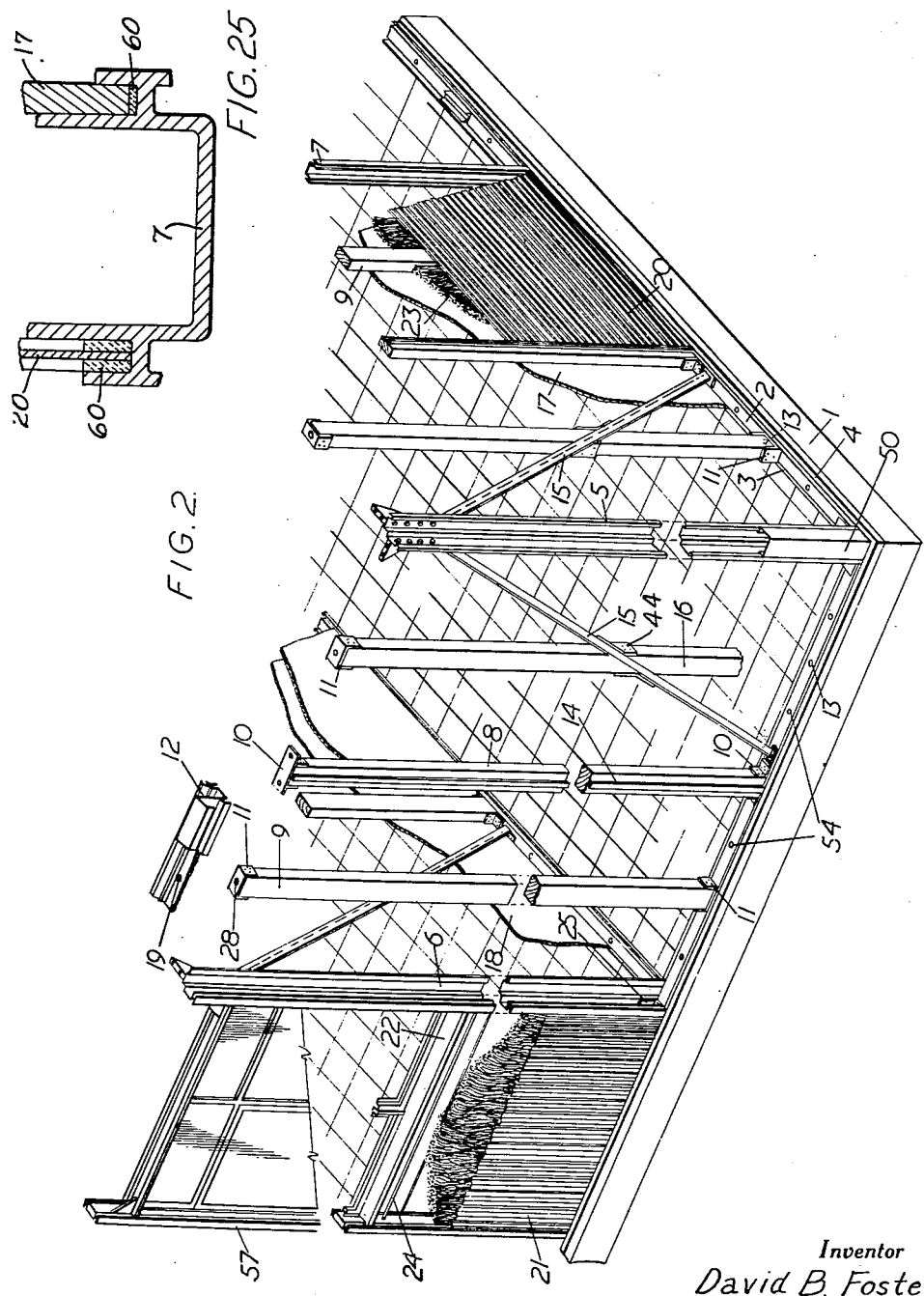

Nov. 28, 1961 D. B. FOSTER 3,010,547
PREFABRICATED BUILDINGS
Filed Aug. 15, 1955 4 Sheets-Sheet 3
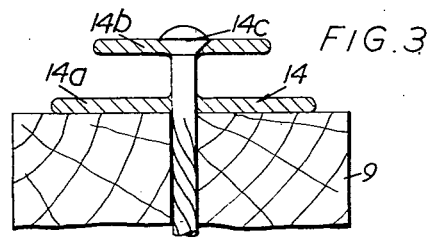
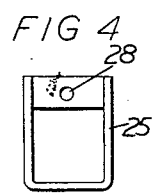
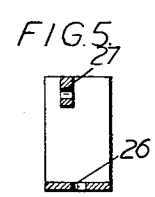
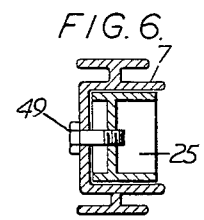
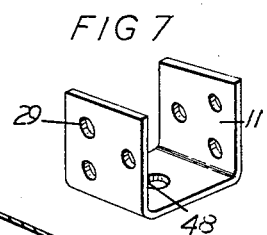
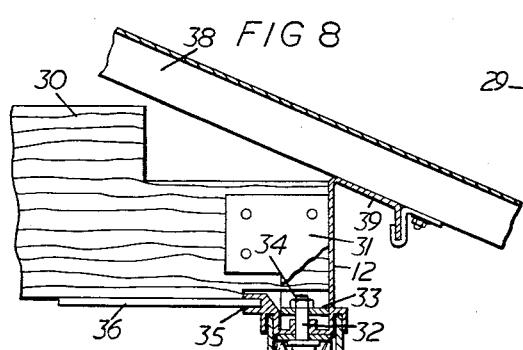
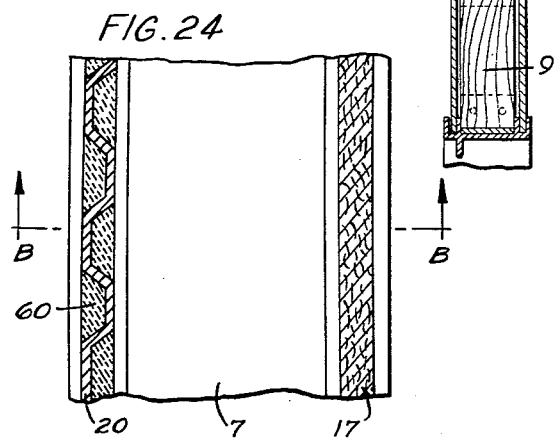
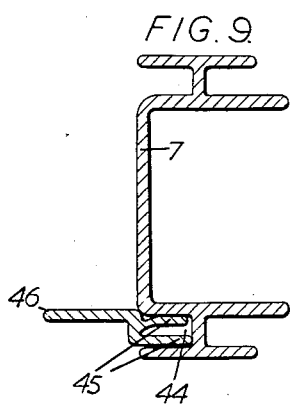
Inventor
David B. Foster
By *Holcomb Wethill* ...
Attorneys Nov. 28, 1961  D. B. FOSTER  3,010,547
PREFABRICATED BUILDINGS
Filed Aug. 15, 1955  4 Sheets-Sheet 4

Inventor
David B. Foster
By
Holcomb, Wethuill & Buielois
Attorneys

3,010,547
PREFABRICATED BUILDINGS
David Blythe Foster, London, England (White House, Sunninghill Road, Windlesham, Surrey, England)
Filed Aug. 15, 1955, Ser. No. 528,303
Claims priority, application Great Britain Oct. 27, 1952
3 Claims. (Cl. 189—34)

This application is a continuation-in-part of my copending application Serial No. 331,051 filed January 13, 1953, and now abandoned.

The present invention relates to prefabricated buildings having a double skin construction of which the building sides are constructed as rectangular frames each comprising a base member, a top member and two upright members, the said members preferably being constructed of extruded aluminium sections having pairs of inwardly facing channels into which the edges of panels of sheet material forming the outer and inner skins are fitted with the interposition of sealing material, such as a sealing mastic or rubber strip or tube, at least in the channels into which the outer skin is fitted. The outer skin is preferably made of corrugated sheet aluminium, and the inner skin may be made of hardboard or other suitable material.

The main frame members are bolted together at the corners by suitable brackets, and other uprights or horizontal members may be secured in position by brackets to form supports for the edges of the panels, window sills or window or door lintels.

Some of the main frame members of one frame may also form part of another frame; for example the frame upright members at the corners of a building may be common to two adjacent frames at adjacent sides of the building and be provided with two pairs of parallel channels facing in directions at right angles to one another; other frame upright members may be common to two adjacent frames forming part of the same wall and be provided with two pairs of parallel channels facing in opposite directions; for uprights where an internal partition is to be joined, the metal upright member is formed with three pairs of grooves facing in three directions at right angles. For internal partitions, both skins may be made of hardboard or the like.

A feature of the invention consists in a method of assembling the panels of the outer skin into the frame so that the edges of all the panels will be fitted into channels of the frame or intermediate members. To this end flexible panels are used, and the full-length panels, that is to say the panels extending over the full height of the frame, are first assembled by flexing a panel about a horizontal axis, whereby its upper and lower ends can be inserted in the outer channels of the top and base frame members whereafter the panel is restored to its plane condition and then slid sideways into a side channel; an intermediate channel upright is then fitted over the remaining edge of the panel and secured in position. Further full length panels are then assembled in like manner, proceeding if necessary at the opposite side of the newly inserted intermediate upright and/or from other uprights until a state is reached, in which only a final panel or panels are still to be assembled which are of short length, for example below and/or above a window or above a door lintel; each short length panel is flexed about a vertical axis so that its side edges can be inserted into two opposed side channels, the panel then being slid downwards or upwards into the channel in the base or the top member whereafter the remaining free edge is embraced by fitting a horizontal channel member, for example, a window sill or a window or door lintel member into position and securing it between adjacent vertical members. Mastic or other sealing material is inserted in the channels before the edges of the panels are inserted therein, so as to provide a weatherproof seal. The mastic or other sealing material, in conjunction with the inserted panels, damps the natural resonance of the aluminium frame structure. The inner walls of the channels may be wider than the outer walls thereof to provide support for the rear of the edge of a panel while it is being slid into a channel.

The flexible panels used preferably comprise thin sheet aluminium which is lightly corrugated so as to be sufficiently thin as to fit within the narrow channels of the frame members and produce a good weatherproof seal with the sealing mastic. Thus the full-length panels will have their corrugations extending horizontally and the short panels will have their corrugations extending vertically.

According to a feature of the invention some or all of the intermediate channel uprights are constituted by timber uprights to the inner side of which the inner skin panels can be secured by nails or screws driven into the timber, while an extruded metal member of approximately H-section, presenting two oppositely facing channels for respectively accommodating the edges of two adjacent outer-skin panels, is secured to the outer side of the wooden upright, for example, by drive nails driven through suitable holes in the web of the H-section metal member. In this case the method of erection may be carried out by securing these intermediate uprights in position without the H-section members before the skin panels are inserted; after the assembly of each full-length outer-skin panel the H-section member is fitted over the free edges of the latter and secured to the timber upright. The panels forming the inner skin may be assembled in the same manner, as an in simultaneous progression with the panels forming the outer skin; alternatively the inner skin panels may be assembled subsequent to the complete assembly of the outer skin.

Preferably the base and top frame members are provided at modular intervals with means for fixing angle brackets or the like for securing upright main or intermediate frame members, whereby standard base and top members may be used for constructing buildings to different plans. According to a feature of the invention single fixing means, such as hank bushes, are provided for this purpose on the top and base members at the modular intervals and preferably on the modular centre lines.

The single fixing bolts extending through the hank bushes of the top members are, according to a further feature of the invention, used for securing other parts of the building structure, for example the brackets for securing the ceiling joists.

A further feature of the invention relates to the manner of supporting thermal insulation material between the two skins. This is effected by using a blanket or flexible sheet of the thermal insulating material, for example glass wool, and hanging or draping this over a wire or cord (preferably a spring curtain wire) extending between two adjacent upright members.

In order that the invention may be more readily understood, a building constructed in accordance therewith will now be described with reference to the accompanying drawings, in which:

FIG. 1 is a perspective view, partly cut away, showing details of the construction of a building according to the invention.

FIG. 2 is a perspective view, on an enlarged scale of the framework at the corner of the building shown in FIG. 1, FIG. 3 is a fragmentary cross section of a wooden upright with a connector strip attached thereto, FIGS. 4 and 5 are respectively a side elevation and a sectional elevation at right angles thereto showing a bracket serving for the connection of extruded aluminium uprights to the top and base members of the frame.

FIG. 6 is a cross section through an aluminium upright showing the manner in which it is secured to the bracket illustrated in FIGS 4 and 5.

FIG. 7 is a perspective view of a bracket serving for the connection of the ends of wooden uprights to the top and bottom members of the frame.

FIG. 8 shows a detail of the roof and ceiling construction.

FIG. 9 is a cross section of an extruded aluminium upright of a form suitable for door and window surrounds and a seal member of the kind employed for door jambs and window side seals, engaged in a groove of said upright.

FIG. 24 is a fragmentary cross-section on an enlarged scale taken along the line A—A of FIG. 1, and showing the seating of the panel members in the mastic in the channels of the uprights, and FIG. 25 is a transverse cross-section taken along the line B—B of FIG. 24.

Figure 10:
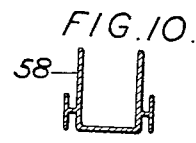
FIGS. 10 to 22 are cross sections of various extruded members employed.
Figure 11:
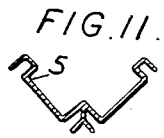
Figure 12:
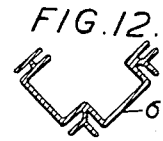
Figure 15:
Figure 17:
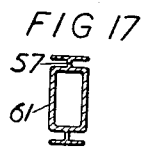
Figure 18:
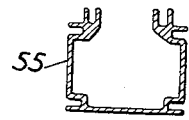
Figure 19:
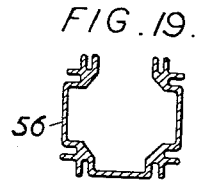

Referring to the drawings, 1 is a concrete raft, on which a base frame constructed of extruded aluminium base members 2 (FIG. 15) is secured by foundation bolts extending through holes 54, a mastic dampcourse being interposed. The base frame members 2 are provided with two upwardly facing parallel channels 3 and 4 along their inner and outer edges respectively. Extruded aluminium uprights comprising corner uprights 5 (FIG. 11), junction uprights 6 (FIG. 12) at points of junction with interior partition walls, uprights 7 (FIG. 6) adjacent doors or windows and other uprights as shown at 55 (FIG. 18) for use between adjacent doors, as shown at 57 (FIG. 17) between adjacent windows, as shown at 58 (FIG. 10) at long windows, and as shown at 56 (FIG. 19) at partition-crossover points, are secured to the base frame by brackets at the position shown.

Figure 14:
Figure 16:
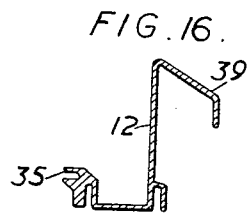

Top members 12 (FIG. 16) are then secured along the outer walls and top members 52 (FIG. 14) along the partition walls, the connections between the uprights and the top and bottom members being effected by brackets as will be described. After a self-supporting skeleton framework has thus been erected, timber uprights are erected between the metal uprights, namely main timber uprights 8 at spacings corresponding to the width of the outer skin panels employed, and subsidiary timber uprights 9 at intermediate points these timber uprights being secured by suitable brackets 10 or 11 to the base frame members 2 and by similar brackets to top members 12. Brackets of the form shown at 11 are employed for all wooden uprights except at the points where two lengths of base members 2 are joined, brackets 10 being used at the latter point. The brackets 11 (see FIG. 7) are U-shaped and provided with transverse holes 29 for attachment to the timber and with a central hole 48 in their base arranged for single-hole fixing to the top and base members. The latter are for this purpose provided with suitable apertures 13, in which so-called hank bushes 19 (see FIG. 2) are preferably secured for receiving the threads of bracket attachment screws, said apertures being arranged along the centre line of the members in modular spacing preferably corresponding to half the width of the outer skin panels, so as to permit the erection of a subsidiary wooden upright 9 centrally of each outer skin panel.

The hank bushes are located at such modular intervals as to give adequate panel support, and it has been found that 18 inch and 24 inch centres are appropriate when using panels which are 36 inches and 48 inches wide respectively.

A regular system of holes 54 (FIG 2) (about ¾″ diameter) are provided alternately between the hank bushes; these holes are suitable for the insertion of foundation bolts (through base members) or electric wiring (in top sections). The main timber uprights 8 have secured to their outer faces extruded aluminium connector strips 14 of substantially H-shaped cross section (see FIGS. 3 and 22) to provide channels suitably aligned with the outer channels of the top and base frame members for accommodating the edges of the outer skin panels. On the other hand the inner faces of the main timber uprights 8, and both inner and outer faces of the subsidiary timber uprights 9, are left plain, the inner faces of both uprights being aligned with the inner edges of the inner skin channels of the top and base members of the frame, so that hardboard inner panels may be secured by nailing, screwing or in any other convenient manner to the inner faces of all the timber uprights. It will be observed that in this manner a flush junction can be obtained between adjacent inner skin panels by simply nailing or screwing their edges side-by-side to one of the wooden uprights, thus avoiding the necessity of interrupting the continuous surface of the inner wall by channels.

Wind strutting members made of T-section metal, preferably steel, extend diagonally as shown at 15 adjacent the corner upright 5 and in a partition wall adjacent junction upright 6. In order to permit the inner skin panels 17 and similar panels 18 forming the skin of the partition wall to be secured for further support at half-modular intervals, a divided subsidiary timber upright member 16 extends to the strut 15 from the top and base frame members, to which it is secured similarly to the subsidiary timber uprights 9, while brackets 44 secure each part of it to the strut 15. Cover plates 50 are attached to the outer side of the corner uprights 5 for protection and to improve the appearance.

Figure 23:
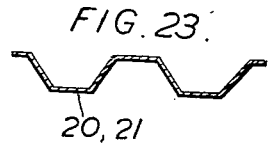
FIG. 23 shows the profile of the outer skin panels.

While the inner skin panels 17 and the partition wall panels 18 preferably consists of hardboard the outer skin panels are preferably sheets of aluminium or aluminium alloy corrugated from edge-to-edge. As will be seen from the profile shown in FIG. 23 the depth of the corrugations is small compared with their width and the total thickness of the corrugated panels is made such that it will just fit into the straight outer channels of the upright top, bottom and transverse members of the frame. As a result the panels are extremely rigid when all their edges are embraced by channels. In practice the depth of the corrugations may be ¼″, the total thickness of the panel and the width of the channels $\%_{32}″$ the pitch of the corrugations being, for example, 1″. Panels 20, in which the corrugations extend horizontally, are employed for all full-length panels, i.e. panels which extend over the whole height from a top member 12 to a base member 2, while part-length or short panels 21, that is to say panels which extend between an intermediate horizontal member such as a window sill 22 or a window or door lintel, and a top or base member have their corrugations extending vertically. Interposed between the outer and inner skins are insulating sheets 23, for example of glass wool, which are suspended by means of expanding curtain-rod wires 24 secured to each of a pair of adjacent uprights or to the brackets securing the upper ends thereof.

In erecting the building, the aluminium framework including the base members, metal uprights and top members is erected first; then the timber uprights; and then the panels are fitted. Assembly of the outer panels may be started for example adjacent one of the corner members 5, where a full-length outer skin panel 20 is to be inserted. If the upright at the other side of this panel is an extruded aluminium upright, this upright is temporarily removed from the frame, while this is unnecessary in the case of a timber upright as shown at 8 provided that the channelled connector strip 15 has not yet been fixed. The insertion of the panel is effected by flexing the panel about a horizontal axis, with its concave side facing the frame structure whereupon the upper and lower edges of the panel may be readily inserted into the outer channels of the top and base members at a position slightly away from the final position of the panel, so as to be clear of the channel in the upright 5, into which the panel is to be finally engaged with its adjacent edge. The panel is then straightened and slid slightly sideways so as to engage the said channel of the upright 5, when it will be in its final position and prevented by the walls of this channel from being further flexed. Now the upright at the free edge of the panel is returned to its position in the frame, thereby causing its outer channel to engage the free edge of the panel just inserted, or in the case of a wooden upright, the connector strip 14 is placed over the free edge of the panel and secured to the upright. The manner in which the strip 14 is secured to the timber upright 9 is shown in FIG. 3 in a cross section drawn to a larger scale.

Figure 22:
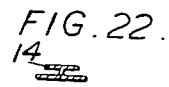

As will be seen in FIGS. 3 and 22, the member 14 is of asymmetrical H-section, the flange 14a adjacent the timber upright 9 being wider than the flange 14b at the outer side. The strip 14 may be secured to the upright 9 by drive nails 14c. Although the thickness of the web of the H profile is for practical reasons, only about 0.1 inch so that the holes for the nails penetrate the outer surfaces of the web (see FIG. 3) this does not in practice lead to any difficulty.

When the upright or the connector strip is in position a further full length panel is similarly inserted at the other side of the upright or strip, and further panels are inserted beginning from the other side of the corner upright 5 and/or other suitable uprights of the building, until finally all full length outer skin panels and all uprights are in position, while only the part-length panels 21 in which the corrugations extend vertically are left to be inserted to complete the outer skin. In order to insert the latter, the transverse sill or lintel members 22 which are to confine these panels along their upper or lower edges, are removed if already inserted, whereafter the panels 21 are inserted into the channels of the two adjacent uprights after flexing the panels about a vertical axis, and then after re-straightening engaged into the groove of the top or bottom member confining their third edge. The transverse members 22 can then be inserted into the frame and secured in position with its outer channel embracing the free edge of the panel 21, thus completing the outer skin of the building.

The channels into which the outer skin panels engage are sealed by a mastic or compound sealing mass 60. It has been found that the speed and neatness of operation can be greatly increased if the sealing mass is inserted into the channels before the panels are inserted. With the method of insertion described this offers no difficulties, since only a small amount of sliding movement of the panels is required, and this takes place in the direction in which the corrugations extend, whereas the corrugated edges are merely driven vertically into the soft sealing mass.

While the inner skin may be assembled in the same manner, I prefer a simplified manner of erection of the inner panels, which will be described further below.

FIGS. 4 and 5 show a bracket of the kind employed for securing extruded metal uprights, for example that shown at 7 in FIG. 2 to the top and base frame members. The bracket comprises a U-shaped body 25 provided in its base with a central securing hole 26 for single-hole fixing at one of the points 13 of the frame and having a bridge member 27 extending across the two legs of the U adjacent one side thereof and provided with a screw-threaded bore 28. FIG. 6 shows the manner in which an upright 7 is secured to the bracket 25 by a screw 49 passing through a suitable hole in the upright and engaging the screw-threaded bore 28 in the bridge 27 of the bracket. When the brackets 25 are used on uprights of the box-type profile shown in FIG. 17, one of the two web strips 61 is cut away for a suitable height to allow the bracket to be secured to the other web strip 61 in the manner shown in FIG. 6.

The ceiling construction, a detail of which is shown to a larger scale in FIG. 8 comprises joists 30 which extend across the building and are supported on the top frame members 12 and secured thereto by means of brackets 31. The brackets are preferably arranged at the modular intervals and preferably secured to the top members 12 by the screws 32 employed for attaching the brackets 11 or 25 of the uprights to the underside of the top member. For this purpose the brackets 31 are formed of two plates connected by a transverse bridge piece 33, through which the shank of the screw 32 extends to receive a nut 34 at the upper side of the bridge 33. The top member 12 of the outer wall frame is provided at its inner side with an inwardly facing channel 35 engaged by the outer edges of the ceiling panels 36. As will be seen in FIG. 8, the roof joists are so recessed that their lower surfaces are in the same plane as the upper surfaces of the ceiling panels 36, so that the latter may be supported throughout the ceiling area by being nailed or screwed to the ceiling joists 30. Further attachment surfaces for these panels are provided by wooden stiffener members 37 (FIG. 1) interposed between the wooden joists 30 and extending transversely thereto, with their lower surfaces flush with the lower surfaces of the joists. In this manner all ceiling panels can be nailed or screwed to the joists and stiffeners with their edges abutting, thus producing an uninterrupted flush ceiling surface.

Figure 1:
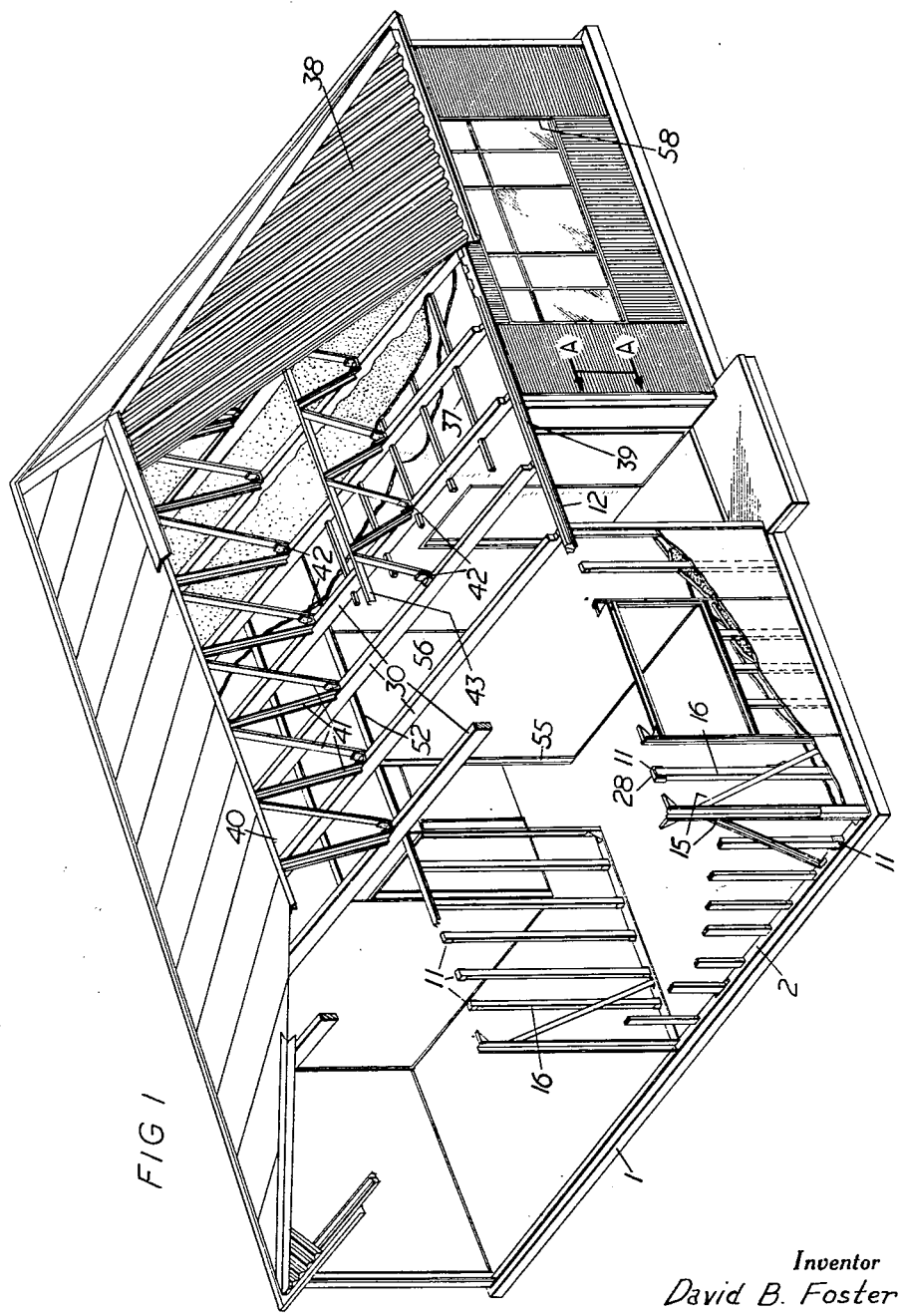
Figure 20:
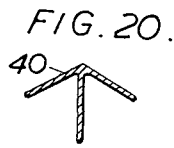
Figure 21:
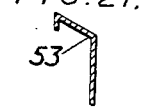

A roof of corrugated aluminium panels 38 is provided in this embodiment, the panels being supported on the one hand on a flange 39 of the top frame members 12 (FIG. 16) and on the other hand on a ridge member 40 (FIG. 20) having a central vertical web and two flanges projecting, approximately in T-fashion, to the two sides at inclinations corresponding to the slope of the roof. The ridge member is supported by L-section aluminium struts 41 two extending upwardly in V-shape from each of the joists 30, to which they are secured by suitable brackets 42 while at their upper ends one flange of each is screwed to the web of the ridge member 40 so as to form a series of adjacent triangles extending downwardly from the ridge member. Preferably as shown in FIG. 1, a partition wall is arranged underneath the ridge member 40, so that the top of the partition wall, which consists of extruded aluminium members 52 (FIG. 14) combines with the struts 41 and the ridge member 40 to form a lattice girder supporting the ridge of the roof. An auxiliary truss similar to this lattice girder is preferably provided at an intermediate point of the width of the roof and includes a purlin member 43 supporting the roof. While generally no partition wall will be available as additional support for the auxiliary truss, the stiffener members 37 may be employed to supplement it to form likewise a kind of lattice structure.

The fact that timber uprights are provided at half-modular intervals, facilitates the erection of the inner skin panels. Whenever the distance between consecutive aluminium uprights is more than one modular distance, the total number of inner skin panels placed side-by-side between consecutive aluminium uprights is arranged, if necessary by including two half-width panels, to be at least three; the two outermost panels are fitted by flexing them into engagement with the top and bottom channels and then sliding them respectively into engagement with the inner channel of the adjacent aluminium upright; the remaining panel or panels may then be sprung into the inner channels of the top and base frame members in their final positions without requiring lateral sliding. All the inner panels are then secured by nails, screws or the like driven into the timber uprights. Where the spacing between two consecutive aluminium uprights is only one modular distance, two inner skin panels are employed the aggregate width of which is slightly less than the width of a standard panel. One of these is first inserted and slid sideways in the manner described above until it reaches the bottom of the channel in the adjacent upright. The aggregate width of the modified panels is made such that the second modified panel can then be sprung into the top and bottom grooves between the panel first inserted and the edge of the vertical channel in the adjacent aluminium upright. The second panel is then slid partially into this vertical channel, whereafter either the gap thus left between the two panels may be closed by a filler in a well-known manner, or the width of the gap can be reduced by partially withdrawing the first panel from its associated vertical channel.

Figure 13:
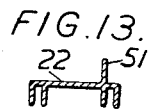

FIG. 9 illustrates a method by which door jambs and abutment flanges at the sides of a window may be provided in alignment with the flange 51 of the lintel and/or window sill members 22 (FIG. 13). It will be appreciated that the aluminium uprights forming the two sides of door or window frame are provided with channels, and while these channels are employed above the lintels and below the window sills for accommodating the edges of the short outer skin panels, they are available for other purposes at the sides of the actual doors or windows. As shown in FIG. 9 one of the channels shown at 44, is employed for accommodating a forked portion 45 provided on an extruded aluminium member of which the remainder forms a strip 46, which forms a flange aligned with the flange 51 of the sill and/or lintel members when the portion 45 is forcibly driven into the channel 44, the forked profile 45 being slightly compressed by the walls of the channel 44 and thereby being firmly retained in position.

Whilst a particular embodiment has been described, it will be understood that various modifications may be made without departing from the scope of the invention as defined by the appended claims. The standardized components of modular dimensions which are used according to this invention readily enable buildings of different design and plan to be constructed.

I claim:

1. In a prefabricated building a rigid double-walled panel comprising a substantially rectangular self-supporting frame comprising four sides rigidly connected to each other, and formed with a pair of inwardly opening parallel channels extending about the inner periphery of said frame, an inner wall member having its edges seated in one of said channels and an outer wall member made from a sheet of light, rust-proof flexible metal formed with corrugations extending from edge to edge across the sheet, the edges of said metal sheet being seated in the other channel and the width of said other channel being approximately equal to the depth of said corrugations so that said sheet is prevented from bending in one direction by the walls of said other channel and prevented from bending in a transverse direction by said corrugations, said channels containing a sealing compound by means of which the space between said wall members is sealed in to form a dead air space.

2. A panel as claimed in claim 1 in which said corrugations have a depth of the order of one quarter of their pitch.

3. A panel as claimed in claim 1 in which said metal sheet has a thickness of the order of $1/32$ of an inch, the depth of the corrugations is of the order of $1/4$ inch and the pitch of the corrugations is of the order of one inch.

References Cited in the file of this patent

UNITED STATES PATENTS

| | | |
|---|---|---|
| 555,097 | Hurd | Feb. 25, 1896 |
| 613,599 | Pease | Nov. 1, 1898 |
| 633,197 | Hoerr | Sept. 19, 1899 |
| 1,241,635 | Klein | Oct. 2, 1917 |
| 1,258,409 | Hill | Mar. 5, 1918 |
| 2,085,281 | Wagoner | June 29, 1937 |
| 2,154,520 | Mackin | Apr. 18, 1939 |
| 2,472,756 | Nelsson | June 7, 1949 |
| 2,641,449 | Antony | June 9, 1953 |
| 2,691,720 | Simmons | Oct. 12, 1954 |
| 2,801,716 | Colby | Oct. 6, 1957 |

FOREIGN PATENTS

| | | |
|---|---|---|
| 243,769 | Great Britain | Dec. 7, 1925 |
| 647,503 | Great Britain | Dec. 13, 1950 |
| 814,210 | France | Mar. 15, 1937 |
| 359,987 | Italy | July 9, 1938 |
| 113,033 | Australia | May 2, 1941 |